United States Patent [19]

Pennartz

[11] Patent Number: 5,091,097
[45] Date of Patent: Feb. 25, 1992

[54] FIRE EXTINGUISHING AND INHIBITING MATERIAL

[75] Inventor: Edmund R. Pennartz, Kirkland, Wash.

[73] Assignee: Old Firehand Corporation, Bothell, Wash.

[21] Appl. No.: 710,782

[22] Filed: Jun. 5, 1991

[51] Int. Cl.$^5$ .............................................. A62D 1/00
[52] U.S. Cl. .......................................... 252/7; 252/3; 252/6.5; 252/610; 252/607; 106/18.17; 106/18.2; 169/45; 169/46
[58] Field of Search ................. 252/7, 3, 6.5, 610, 252/607; 106/18.17, 18.2; 169/45, 46

[56] References Cited

U.S. PATENT DOCUMENTS

| | | | |
|---|---|---|---|
| 4,090,967 | 5/1978 | Falk | 252/3 |
| 4,359,096 | 11/1982 | Berger | 169/44 |
| 4,804,482 | 2/1989 | Schuler | 252/7 |
| 4,913,835 | 4/1990 | Mandel et al. | 252/190 |

*Primary Examiner*—Stephen J. Lechert, Jr.
*Assistant Examiner*—Nina Bhat
*Attorney, Agent, or Firm*—Cassidy, Vance & Tarleton

[57] ABSTRACT

In one embodiment of the present invention, a fire extinguishing and inhibiting material comprising potassium hydroxide, citric acid, diammonium phosphate, and urea in an aqueous solution is applied to an object to extinguish and inhibit fires. In accordance with another embodiment of the present invention, a film-forming extinguishing material comprising potassium hydroxide, citric acid, diammonium phosphate, urea, surfactant, and trichloroethylene is applied to liquid fuel and self-propelled liquid fuel fires to extinguish and inhibit combustion.

9 Claims, No Drawings ent leakage. Water, wet water or foam are not acceptable agents for use on electrical equipment fires.

Class D fires respond to application of dry powder, which prevents oxidation and the resulting flame. The application of water on a metal fire is to be avoided because it will cause the fire to burn more violently and can cause explosions.

The most common fire fighting agents are thus water and water based agents, dry chemical, and gas. Water and water based agents are typically used on carbonaceous fires. Water extinguishes fires by cooling the fuel below the flame point or combustion temperature. The disadvantage of water and water based agents is that water is not effective on all combustible materials. In addition, large quantities of water are not always available. While dry chemicals offer the advantage of being nonconductors of electricity, they tend to be environmentally unfriendly and hazardous to fire fighters. Gases such as carbon dioxide and halons are toxic and, thus, environmentally unfriendly.

Extinguishing Class B liquid fires presents unique difficulties to fire fighters. With respect to pools of burning liquid, combustion takes place adjacent the surface of the liquid due to evaporation of the liquid into the air. While foam has been used in the past to smother the flame on liquid fires, it has the disadvantage of requiring substantial amounts of foam material to completely extinguish the fire. Another method gaining rapid commercial acceptance utilizes a chemical that causes a film and foam layer on top of the liquid pool to interrupt evaporation. This chemical is commonly known as aqueous film-forming foam (AFFF). The disadvantages of AFFF are that it requires a special nozzle to apply the agent, the agent takes a substantial amount of time to build a foam layer sufficiently thick to extinguish the flames, and it does not lower the temperature of the liquid pool, presenting the danger of reignition when the liquid fuel is agitated. Self-propelled three-dimensional liquid fires, such as oil and gas wellhead fires, are not extinguishable using foam because the liquid is expelled into the air at a high rate from the wellhead, with the residue forming burning liquid pools on the ground. This type of fire is extremely hot and requires very large amounts of fire fighting agent to permanently extinguish the fire. One method for extinguishing oil and gas wellhead fires uses an explosive charge that is detonated immediately above the wellhead to force the flame front away from the wellhead area. This temporarily creates a vacuum that deprives the fire of oxygen. If the liquid fuel is not immediately doused and cooled with a fire fighting agent, the returning air rushing in to fill the vacuum can cause the hot liquid fuel to reignite. This particular method is extremely dangerous and also requires substantial amounts of fire fighting agent.

Consequently, there is a need for a fire extinguishing and inhibiting material that not only rapidly and permanently extinguishes a pool of burning liquid, but is also effective in extinguishing self-propelled liquid fuel fires.

FIRE EXTINGUISHING AND INHIBITING MATERIAL

TECHNICAL FIELD

The present invention pertains to fire fighting agents, particularly to an aqueous solution for extinguishing and inhibiting combustible material fires, and to an aqueous solution for extinguishing and inhibiting liquid fuel fires, including self-propelled liquid fuel fires.

BACKGROUND OF THE INVENTION

Three things are required for a fire. Fuel-something that will burn in the presence of heat when combined with oxygen, thereby releasing more heat and, as a result, reducing itself to other chemical compounds. Heat-which can be considered the catalyst that accelerates the combining of oxygen with fuel, in turn releasing more heat. Oxygen—the element which combines chemically with other substances through the process of oxidation. Rapid oxidation, accompanied by a noticeable release of heat and light, is called combustion or burning. Remove any one of these elements and the fire goes out.

The National Fire Protection Association has classified fires into three basic types:

Class A Fires—Fires and ordinary combustible materials such as wood, cloth, paper, upholstery materials, etc.

Class B Fires—Fires and flammable petroleum products or other flammable or combustible liquids, greases, solvents, paints, etc.

Class C Fires—Fires involving energized electrical equipment where the electrical nonconductivity of the extinguishing media is of importance. In most cases where electrical equipment is deenergized, extinguishers suitable for use on Class A or B fires may be employed effectively.

A fourth class of fire, Class D fire, is defined as fire in flammable metal. Class D fires are not considered a basic type of fire since they are generally caused by a Class A, B or C fire. Usually, Class D fires involve magnesium.

It is known that each material, whether it be a solid, liquid, or gas, has a flame or self-ignition point. When the material is maintained at a temperature below this flame point, it will not burn. Thus, most prior methods for extinguishing fires attempt to cool the burning material below the flame point. Class A fires respond best to water or water-type extinguishers that cool the fuel below combustion temperatures. Class B and C extinguishers are effective but not equal to the wetting/cooling action of a Class A extinguisher.

Class B fires respond to carbon dioxide ($CO_2$), halogenated hydrocarbons (halons) and dry chemicals, all of which displace the oxygen in the air and thereby make combustion impossible. Foam is effective, especially when used in large quantities. Water is ineffective on Class B fires and may cause the fire to spread.

Class C fires involving electrical wiring, equipment, or current respond best to $CO_2$, which displaces the oxygen in the atmosphere, making combustion difficult. Dry chemicals are effective on Class C fires but have the disadvantage of contaminating the local area with powder. Also, if used on wet and energized electrical equipment, dry chemicals may aggravate electrical cur-

SUMMARY OF THE INVENTION

The present invention is directed to an aqueous film-forming extinguishing liquid that is comprises by weight of one percent (1%) to five percent (5%) potassium hydroxide, two percent (2%) to seven percent (7%) citric acid, four percent (4%) to fourteen percent (14%) diammonium phosphate, and four percent (4%) to eight percent (8%) urea. Ideally, these chemicals are combined in an aqueous solution.

In accordance with another aspect of the present invention, the material further includes by weight one percent (1%) to six percent (6%) surfactant and one-fourth percent (0.25%) to one percent (1%) trichloroethylene. Ideally, the surfactant coprises two percent (2%) to four percent (4%) synthetic fluoridated surface active agent formed from a combination of a long alkyl chain, epsom salt, and diethylene glycol monobutyl ether and one percent (1%) to two percent (2%) of a combination of hydrolysed protein and surface active agent.

The present invention is also directed to a method of extinguishing and inhibiting fires that comprises the step of applying to a solid, liquid, or gas the fire extinguishing and inhibiting material that comprises by weight one percent (1%) to five percent (5%) potassium hydroxide, two percent (2%) to seven percent (7%) citric acid, four percent (4%) to fourteen percent (14%) diammonium phosphate, and four percent (4%) to eight percent (8%) urea.

In accordance with another aspect of the present invention, the method of extinguishing and inhibiting a self-propelled liquid fire comprises applying a material comprising by weight one percent (1%) to five percent (5%) potassium hydroxide, two percent (2%) to seven percent (7%) citric acid, four percent (4%) to fourteen percent (14%) diammonium phosphate, four percent (4%) to eight percent (8%) urea, one percent (1%) to six percent (6%) surfactant, and one-fourth percent (0.25%) to one percent (1%) trichloroethylene. Ideally, these materials are in an aqueous solution when applied to the self-propelled liquid fuel fire.

In accordance with still yet another aspect of the present invention, a method of extinguishing and inhibiting a burning pool of liquid fuel comprises applying a material comprising by weight one percent (1%) to five percent (5%) potassium hydroxide, two percent (2%) to seven percent (7%) citric acid, four percent (4%) to fourteen percent (14%) diammonium phosphate, four percent (4%) to eight percent (8%) urea, and one percent (1%) to six percent (6%) surfactant. Ideally, these materials are in an aqueous solution when applied to the burning pool of liquid pool.

In accordance with another aspect of the present invention, the method includes the further step of injecting the fire extinguishing and inhibiting material into the flow of self-propelled liquid fuel prior to ejection of the fuel into the air.

DETAILED DESCRIPTION

The present invention is directed to an aqueous film-forming extinguishing liquid for Class B fires that also has fire retardant properties for use in Class A and Class D fires. With respect to the latter two classes of fires, the present invention utilizes a unique combination of salts and minerals that has the affect of reducing high combustion temperatures within a matter of seconds. With respect to trees, brush, and other absorbent materials, the present invention is applied in aqueous solution to these materials where it is absorbed into the material fibers. After the water evaporates, the agent remains within the fibers of the material. When a fire occurs, the material will not burn because the minerals and salts absorbed into the fibers melts and releases $CO_2$ that was stored during evaporation, thereby preventing the fiber from igniting. In addition to extinguishing and inhibiting fires, the agent of the present invention acts as a fertilizer for plant material because the salts and minerals of the present invention derive from nitrogen, urea, diammonium phosphate, citric acid, and potassium hydroxide. This may be considered as a 21-53-48 assay fertilizer.

The citric acid is utilized in the present invention as a buffer having an acid base. The potassium hydroxide is very alkaline (pH 13) to bring the buffer back to neutral (6.8 to 7.6). The potassium hydroxide absorbs $CO_2$ to the saturation point. In addition, the potassium hydroxide acts as a saponification agent, changing the molecular structure of oil and gas to make a soap or grease. Crystallized diammonium phosphate issued as an anti-smoldering agent. The ammonia provides a radical that, in combination with the phosphate, acts as a well-known agent for extinguishing fires.

To retard the flammability of a material, urea in combination with nitrogen in pellet, flake, or crystal form is used. This also provides fertilization for plant material.

The afore-mentioned materials are combined in the following amounts by weight:

| Constituent | Percent By Weight |
| --- | --- |
| Potassium hydroxide | 1 to 5 |
| Citric acid | 2 to 7 |
| Diammonium phosphate | 4 to 14 |
| Urea | 4 to 8 |

Preferably, these constituents are mixed in an aqueous solution. An example of a preferred embodiment of the invention is as follows:

| Constituent | Percent By Weight |
| --- | --- |
| Potassium hydroxide | 2.0 |
| Citric acid | 2.5 |
| Diammonium phosphate | 8.0 |
| Urea | 4.0 |
| Water | Balance |

The above composition was tested and found to have a "green rating," which means it is environmentally safe and presents no danger to human, animal, and plant life. The above composition was also tested in a laboratory to determine the Flame Spread Index (FSI) and the Smoke Developed Index (SDI). In this test, six 21" by 48" by ¼" pieces of A-C Douglas fir plywood were placed in a pressure cylinder with spaces between each sheet and mechanically restrained to prevent them from floating. The cylinder was closed and the aqueous solution formed in accordance with the present invention was introduced. A 26.5" Hg vacuum was created for one hour, then 100 psi of pressure was applied for one hour. After this treating cycle was completed, the samples were allowed to drip for a period of time. They were then placed in a circulating air oven and force dried for about 24 hours at 120° F. and then air dried for two days. The samples were put back in the oven and dried for an additional four hours at 120° F. and then air dried for several more days. The approximate moisture content of the plywood at test time was 7.2 percent (7.2%).

In a thirty minute test, the test samples were exposed to a calibrated flame that will produce a flame spread along the entire length of a red oak flooring in 5.5 minutes. The FSI of this calibrated specimen is currently rated at 91. The SDI value for the red oak specimen remains unchanged at 100. In comparison to the calibration specimens, the specimens treated with the solution formed in accordance with the present invention achieved an FSI of 4.38 and an SDI of 61.92. Because the test was extended from ten minutes to thirty minutes, the treated plywood qualified as a fire retardant and suppressant material.

While the agent described above is successful on Class A and Class D fires, it lacks the properties to be effective on Class B liquid fuel fires. In liquid fuel fires, such as in refineries, tank farms, crude oil spills, crude oil tankers, and wherever else flash point fuels, such as gasoline, are stored in bulk, the danger that long pre-burn may build up hot zones in deep fuel layers is present. In these situations, the application of standard protein foams, however applied, results in the foams becoming quickly contaminated with the fuel. As a result, the foams begin to burn themselves and are therefore ineffective. Consequently, it is desirable to create an extinguishing agent that contains rapid knockdown properties, suppresses the release of flammable vapors, resists reignition and burn-back, and has great stability and heat resistance.

In accordance with an alternative embodiment of the present invention, an aqueous film-forming extinguishing liquid for use on Class B liquid fuel fires is formulated as follows:

| Constituent | Percent By Weight |
| --- | --- |
| Potassium hydroxide | 1.0 to 5.0 |
| Citric acid | 2.0 to 7.0 |
| Diammonium phosphate | 4.0 to 14.0 |
| Urea | 4.0 to 8.0 |
| Surfactant | 1.0 to 6.0 |
| Trichloroethylene | 0.25 to 1.0 (optional) |

Preferably, the above-listed constituents are combined in an aqueous solution for application. The surfactant constituent provides a tight film on the top of the pool of liquid that is lighter than the combustible oil and gas. The surface active agent should be fluorinated to provide knockdown capabilities for self-propelled liquid fuel fires. Preferably, the surfactant comprises two percent (2%) to four percent (4%) synthetic fluoridated surface active agent formed from a combination of a long alkyl chain, epsom salt, and diethylene glycol monobutyl ether, and, more preferably four percent (4%), and one percent (1%) to two percent (2%) of a combination of hydrolysed protein and a surface active agent, and, more preferably two percent (2%). Alternatively, four percent (4%) Tridol and one percent (1%) Petroseal can be used. Tridol and Petroseal are unregistered trade names of readily commercially available products. The addition of the trichloroethylene as an optional constituent enables the solution to be effective against self-propelled three-dimensional fires. It may be omitted when fighting burning pools of liquid fuel. The chlorine in the trichloroethylene replaces carbon to reduce flammability and, in combination with the emulsifier surface active agent, can be introduced into a water base.

While this embodiment of the invention is not as environmentally safe as the first embodiment described previously, it is designed for industrial use where the application will prevent even greater environmental harm from the burning oil and gas fire.

The second embodiment of the present invention is extremely endothermic. Thus, when applied to a burning pool of combustible liquid, it forms a tight film across the top of the liquid pool to prevent evaporation of the combustible liquid, thus rapidly knocking down any fire. In addition, the endothermic properties of this material rapidly cools the liquid pool such that it can be physically touched almost immediately after the fire is extinguished without causing injury or damage. Finally, the foregoing embodiment of the present invention has extremely high resistance to reignition and burn-back.

With respect to self-propelled liquid fuel fires, the present invention also provides a method for injecting the extinguishing and inhibiting material into the liquid flow to extinguish the fire in the liquid as it exits into the air and in the residual burning liquid on the ground. More particularly, in accordance with the method of the present invention, the first step comprises gaining access to the conduit carrying the liquid fuel at a location upstream from the exit port of the conduit. An opening is provided in the liquid conduit and a nozzle or second conduit is attached to this opening to provide for the introduction of the fire inhibiting and extinguishing agent. A second conduit or nozzle is positioned on the first liquid conduit at an angle of less than 90 degrees with the fluid flow, and, more preferably, at 45 degrees. This orientation prevents the liquid fuel from being forced into the second conduit or nozzle. Finally, the fire extinguishing and inhibiting material is pumped at positive pressure into the flow of liquid fuel in the first conduit.

It has been found that with this method the liquid fuel exiting the conduit is rendered incombustible because of the introduction of the extinguishing and inhibiting material, thus extinguishing a fire within a very short period of time. In addition, as the liquid falls to the ground and is introduced into the residual pool of liquid fuel that is burning, the secondary fire is also extinguished.

In a preferred embodiment, the constituents of the Class B film-forming extinguishing liquid comprises the following:

| Constituent | Percent By Weight |
| --- | --- |
| Potassium hydroxide | 2.0 |
| Citric acid | 2.5 |
| Diammonium phosphate | 8.0 |
| Urea | 4.0 |
| Surfactant | 6.0 |
| Trichloroethylene | 0.5 (optional) |

The above-described materials are preferably combined in an aqueous solution. This Class B extinguishing material has been tested and found to be highly successful, as described more fully below.

TEST NO. 1

A 1 meter wide by 20 meter long and ½ meter below-the-ground deep trench facility was selected as a test bed. The test bed was concrete lined with the vertical walls extending above the ground for a distance of approximately ½ meter. The test bed was oriented with a long axis running north and south. Weather conditions were moderate afternoon temperatures in the 70's with low humidity and 35–40 mph winds from the southwest.

The test bed surface was completely covered with crude oil over a water layer that was used to protect the test bed floor from heat. Gasoline and diesel fuel were added atop the crude oil to accelerate ignition and flame spreading.

The Class B agent of the present invention was pumped from a 55 gallon plastic shipping drum with a ½ hp electric pump and delivered via a 1 inch diameter plastic hose with no nozzle.

In this first test, the test bed was engulfed in flames over the full area. A 100% concentration of the Class B agent of the present invention was applied by a fire fighter starting at the south end of the test bed and working northward along the west (upwind) side of the test bed. No special protective clothing was worn by the fire fighter. The crude oil fire was totally extinguished over the entire test bed area within 25 seconds. In addition, the crude oil surface was only lukewarm to the touch immediately after flame extinguishing.

TEST NO. 2

In this second test, the same conditions applied as in the first test, except the last 5 meters of fire was permitted to continue burning to observe reignition factors. No reignition of the adjacent 15 meters was observed when the last 5 meters was permitted to continue to burn for 5 minutes. The last 5 meters was then extinguished.

TEST NO. 3

The same conditions for test number 3 apply as were used in test number 1, except the Class B agent concentration was diluted to approximately 25%, with the balance being water. All but the last 5 meters of fire were extinguished in 21 seconds. No reignition occurred after 5 minutes, and the last 5 meters was then extinguished.

TEST NO. 4

In test number 4, the same conditions applied as in test number 1, except the Class B agent was further diluted to approximately 5%, with the balance being water. The test bed fire was extinguished within 20 seconds, except for the last 5 meters. At approximately 2 minutes into the reignition test, low flames started to appear on the previously extinguished surface in the vicinity of the reignition test area (the last 5 meters). Reignition advance was very slow over previously extinguished crude oil fires.

TEST NO. 5

Fifteen gallons of fuel was placed in a 45 square foot rectangular pan and ignited. The Class B agent of the present invention was pumped from a 2.5 gallon foam extinguisher. The fire was extinguished after only ½ gallon of the agent of the present invention was applied to the fire. Burn-back resistance was found to be very good.

TEST NO. 6

Liquid fuel was flowing through a 1.5 inch vertical pipe at 10 gallons per minute. A 0.5 inch L.P.G. line was attached at the bottom. The agent line was also attached at the bottom of the pipe. The fuel flow was 10 gallons per minute and the L.P.G. was at 20 psi. The Class B agent was injected into the pipe at a 45 degree angle at 80 psi. The ground fire and the flowing liquid fuel was extinguished in 25 seconds. The L.P.G. was extinguished in 40 seconds.

TEST NO. 7

Fifteen gallons of liquid fuel was placed in a 45 square foot rectangular pan and given a 30 second pre-burn. Approximately 1.25 gallons of the Class B agent of the present invention was used to extinguish the fire in 27 seconds. The fuel was then agitated and a burning torch was applied. The fuel did not reignite.

The need for a crude oil fire extinguishing agent is acutely felt in middle eastern countries, especially in times of war when oil refining and pumping facilities are targets of attack. In addition, crude oil ignited in large trenches was found to be an effective barrier to mechanized weapons, such as tanks and armored personnel carriers. While previous fire fighting agents are available, such as AFFF, these have been found to be ineffective in crude oil fires. More particularly, AFFF is widely known by airport crash/fire/rescue organizations for use on jet fuel fires. While it functions well on refined oil products, such as jet fuel, it enjoys a lesser reputation on crude oil fires. In addition, applying AFFF requires a special foaming hose nozzle and large quantities of water to extinguish petroleum distillate fires and it is not recommended for use on Class D metal fires, such as magnesium. Furthermore, pumps and large amounts of water that are needed to create sufficient pressure for the foam to form are not available in remote, undeveloped terrain such as the desert where fire trenches are located. It has been found to be very difficult to transport the specialized equipment and the large amounts of water so close to these fire trenches. Finally, specially trained fire fighters must be used for AFFF, and these are not always available for one reason or another. Thus, it is likely that field troop units would experience difficulty in effecting a remedy using AFFF with its associated support equipment.

The fire extinguishing and inhibiting material of the present invention enjoys a high degree of success over previous agents. Its fast knockdown capabilities are a result of producing a vapor suppressing and rapid heat reduction film on flammable liquids. Because it is specially formulated to maximize fire knockdown performance with rapid film cover and extinction, it is particularly suitable where fast fire attack is essential to save lives or prevent major escalation. The surface tension characteristics of the film formed by the present invention give the film a positive spreading action over the field surface which helps to promote film cover and extinction.

The present invention can be applied with all standard equipment. The high film-forming characteristics and heat transferabilities makes the present invention suitable for use with hand-held, non-aspiring water spray nozzles. In addition to being very effective as a rapid intervention medium in aviation or other high risk fires where fast fire attack with limited quantities of agent is essential, the present invention has been found to be compatible with and can be applied simultaneously with other foam type agents to the same fire area.

The present invention also enjoys an indefinite storage life when kept in the proper containers. Because of the use of diammonium phosphate, aluminum storage containers should not be used. Bulk storage tanks should be of stainless steel or mild steel with protective epoxy paint. Film-forming properties of the present invention are not affected by freezing and subsequent thaw.

While a preferred embodiment of the invention has been illustrated and described, it is to be understood that various changes may be made therein without departing from the spirit and scope of the present invention. Consequently, the invention is to be limited only by the scope of the claims that follow.

The embodiments of the invention in which an exclusive property or privilege is claimed are defined as follows:

1. A fire extinguishing and inhibiting material, comprising by weight one percent (1%) to five percent (5%) potassium hydroxide, two percent (2%) to seven percent (7%) citric acid, four percent (4%) to fourteen percent (14%) diammonium phosphate, and four percent (4%) to eight percent (8%) urea.

2. The material of claim 1 in an aqueous solution.

3. A film-forming extinguishing material, comprising by weight one percent (1%) to five percent (5%) potassium hydroxide, two percent (2%) to seven percent (7%) citric acid, four percent (4%) to fourteen percent (14%) diammonium phosphate, four percent (4%) to eight percent (8%) urea, and one percent (1%) to six percent (6%) surfactant.

4. The material of claim 3, further comprising 0.25 percent (0.25%) to 1.0 percent (1.0%) trichloroethylene.

5. The material of claim 4 in an aqueous solution.

6. A method of extinguishing and inhibiting fires comprising the step of applying to an object the fire extinguishing and inhibiting material of claim 2.

7. A method of extinguishing and inhibiting self-propelled liquid fuel fires comprising the step of applying the film-forming extinguishing material of claim 5.

8. The method of claim 7, further comprising the step of injecting the film-forming extinguishing agent into the flow of self-propelled liquid fuel upstream of the ejection of the liquid fuel into the air.

9. The method of claim 8, wherein the step of injecting the film-forming extinguishing material further comprises injecting the material at a predetermined angle and at a predetermined pressure into the flow of self-propelled liquid fuel.

* * * * *